(12) United States Patent  (10) Patent No.: US 7,766,433 B2
Mulligan et al.  (45) Date of Patent: Aug. 3, 2010

(54) CARTRIDGE FOR USE AS JOINT IN ENDLESS TRACK CHAIN AND ASSOCIATED METHOD

(75) Inventors: Patrick John Mulligan, Dubuque, IA (US); Daniel Frederick Bihl, Durango, IA (US); Kevin Douglas Schrauben, Bellevue, IA (US); Timothy Dirk Wodrich, Peosta, IA (US)

(73) Assignee: Deere & Company, Moline, IL (US)

( * ) Notice: Subject to any disclaimer, the term of this patent is extended or adjusted under 35 U.S.C. 154(b) by 159 days.

(21) Appl. No.: 11/525,367

(22) Filed: Sep. 22, 2006

(65) Prior Publication Data

US 2008/0073972 A1  Mar. 27, 2008

(51) Int. Cl.
  *B62D 55/00* (2006.01)
(52) U.S. Cl. .................... 305/103; 305/203; 305/106
(58) Field of Classification Search ............... 305/100, 305/102–106, 202–204, 101, 59, 185, 196, 305/198, 117–119
See application file for complete search history.

(56) References Cited

U.S. PATENT DOCUMENTS

| 3,469,891 A | | 9/1969 | Deli |
| 3,492,054 A | * | 1/1970 | Boggs et al. ............. 305/103 |
| 3,554,588 A | * | 1/1971 | Reinsma et al. ........... 403/154 |
| 3,606,497 A | | 9/1971 | Gilles |
| 3,762,778 A | * | 10/1973 | Boggs et al. ............. 305/118 |
| 3,819,242 A | | 6/1974 | Robinson |
| 4,149,758 A | * | 4/1979 | Livesay ................. 305/118 |
| RE30,039 E | | 6/1979 | Clemens et al. |
| 4,199,199 A | | 4/1980 | Granda |
| 4,244,588 A | * | 1/1981 | Langewisch ............. 305/105 |
| 4,251,182 A | | 2/1981 | Schroeder |
| 4,438,981 A | | 3/1984 | Harms |
| 4,560,174 A | | 12/1985 | Bisi |
| 4,818,041 A | | 4/1989 | Oertley |
| 4,840,438 A | | 6/1989 | Cory |
| 5,183,318 A | | 2/1993 | Taft et al. |
| 5,511,869 A | | 4/1996 | Edwards et al. |
| 6,074,022 A | | 6/2000 | Anderton et al. |
| 6,145,941 A | | 11/2000 | Anderton et al. |
| 6,176,491 B1 | | 1/2001 | Bertoni |
| 6,206,491 B1 | | 3/2001 | Hisamatsu |
| 6,371,577 B1 | * | 4/2002 | Hasselbusch et al. ....... 305/100 |
| 6,382,742 B1 | | 5/2002 | Hasselbusch et al. |
| 6,454,366 B1 | * | 9/2002 | Egle ..................... 305/202 |
| 6,656,293 B2 | | 12/2003 | Black et al. |
| 6,739,680 B2 | * | 5/2004 | Hasselbusch et al. ....... 305/202 |
| 6,783,129 B2 | | 8/2004 | Akita et al. |

(Continued)

FOREIGN PATENT DOCUMENTS

EP  0860352  7/2003

(Continued)

OTHER PUBLICATIONS

CASE Extended Life Track Information (1 page) (prior art).

(Continued)

*Primary Examiner*—Jason R Bellinger

(57) ABSTRACT

A cartridge is provided for use as a joint between links of an endless track chain. The cartridge is designed for assembly prior to attachment of the cartridge to the links. An associated method is disclosed.

12 Claims, 3 Drawing Sheets

U.S. PATENT DOCUMENTS

| | | |
|---|---|---|
| 6,869,244 B2 | 3/2005 | Anderton et al. |
| 7,347,513 B2 * | 3/2008 | Johannsen et al. .......... 305/203 |
| 2003/0219181 A1 | 11/2003 | Yamamoto et al. |
| 2004/0114993 A1 | 6/2004 | Anderton et al. |
| 2004/0228676 A1 | 11/2004 | Oertley |
| 2006/0251349 A1 | 11/2006 | Schmeling et al. |

FOREIGN PATENT DOCUMENTS

| | | |
|---|---|---|
| EP | 1391371 A | 2/2004 |
| WO | 81/00545 A | 3/1981 |
| WO | 8908577 | 9/1989 |

OTHER PUBLICATIONS

Cat® SystemOne™ Undercarriage Information (7 pages) (prior art).
Deere J Dozers Product Brochure (24 pages) (prior art).
Drawings Of Prior Art Systems (2 pages) (prior art).
Statement About Track Chain Joints (3 pages) (prior art).
Track Joint Seal Of Deere 850J Crawler (1 page) (prior art).
Communication from the European Patent Office dated Nov. 28, 2007 (6 pages).
Crawler Loader Oil Filled Bucket Pin Bearing (1 page) (prior art).

* cited by examiner

CARTRIDGE FOR USE AS JOINT IN ENDLESS TRACK CHAIN AND ASSOCIATED METHOD

FIELD OF THE DISCLOSURE

The present disclosure relates to joints between track chain links and methods associated therewith.

BACKGROUND OF THE DISCLOSURE

Endless track chains are used on track-type vehicles. The track chain includes a number of links and a joint joining adjacent links for relative rotation therebetween.

SUMMARY OF THE DISCLOSURE

According to the present disclosure, there is provided a cartridge for use as a joint between links of an endless track chain for relative rotation between the links. The cartridge is designed for assembly prior to attachment of the cartridge to the links, promoting the effectiveness of the seal(s) of the joint. An associated method is disclosed.

Illustratively, the cartridge comprises a pin, a bushing, first and second seals, and first and second collars. The pin is received in the bushing for relative rotation between the pin and the bushing. A pair of first links are fixed to the bushing at opposite ends of the bushing. The first and second collars receive the pin at opposite ends thereof on either side of the bushing to respectively capture the first and second seals between the collars and the bushing. The collars are fixed to the pin and a pair of second links but are distinct from the pin and the second links to facilitate formation of the cartridge prior to attachment of the cartridge to the links. Such pre-assembly of the cartridge promotes the integrity of the seals.

The above and other features will become apparent from the following description and the attached drawings.

BRIEF DESCRIPTION OF THE DRAWINGS

The detailed description of the drawings refers to the accompanying figures in which.

DETAILED DESCRIPTION OF THE DRAWINGS

Figure 1:
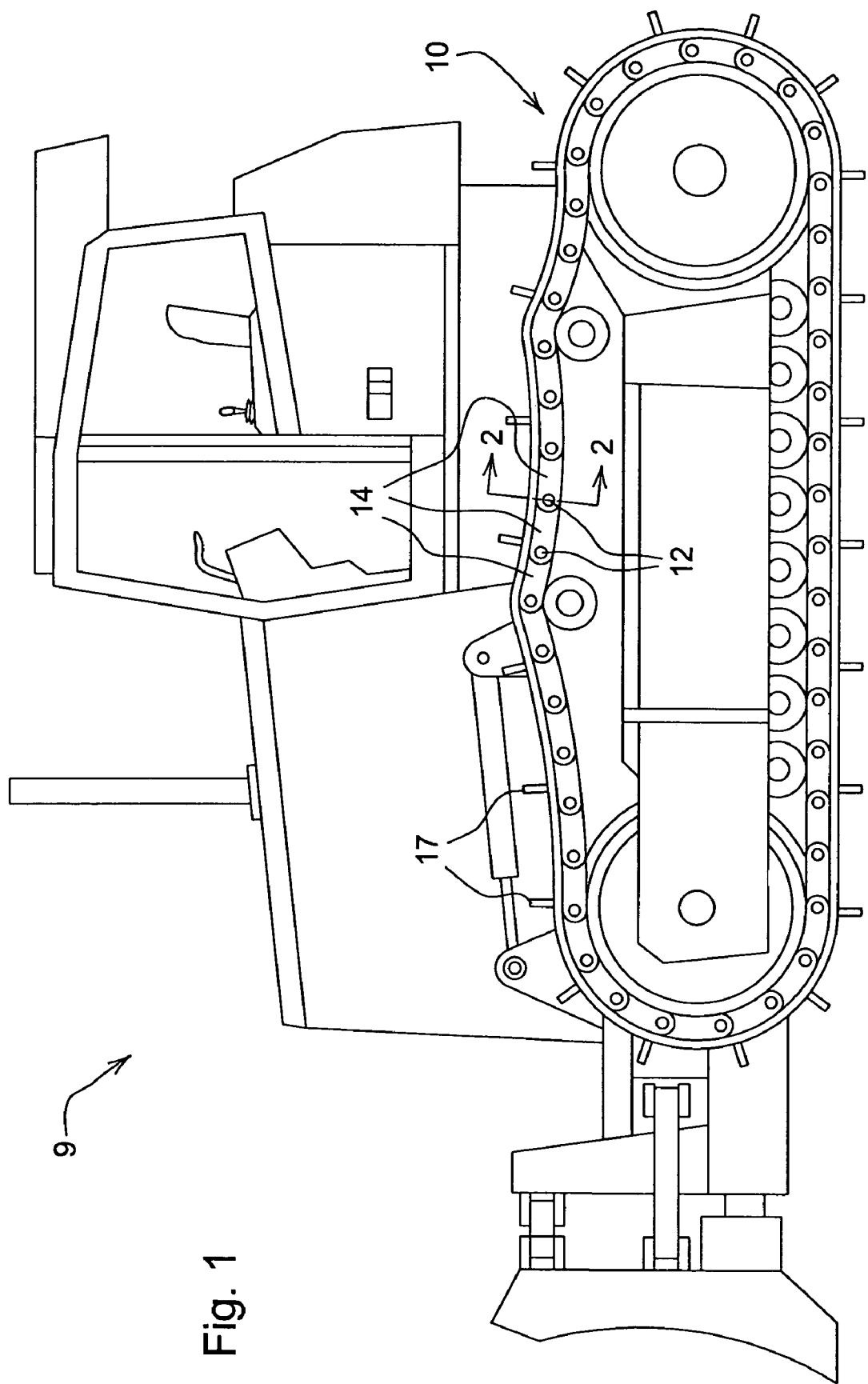
FIG. 1 is a simplified side elevation view of a track-type vehicle.

Referring to FIG. 1, there is shown a track-type vehicle 9 that has an endless track chain 10 for propulsion of the vehicle 9. The vehicle 9 may be any type of vehicle with a track chain. The track chain 10 includes a plurality of links 14 to which one or more traction elements 17 are attached for engagement with a surface underlying the vehicle 9 (master links included in chain 10 not shown in simplified view). The track chain 10 further includes a cartridge 12 acting as a joint joining adjacent links 14 for relative rotation therebetween upon movement of the track chain 10 about its closed-loop path. The cartridge 12 is formed prior to introduction to the links 14. After the cartridge 12 is formed, it is introduced to the links 14a and attached thereto. Such pre-assembly of the cartridge 12 promotes the integrity of seals in the cartridge 12 and thus the longevity of the cartridge 12.

Figure 2:
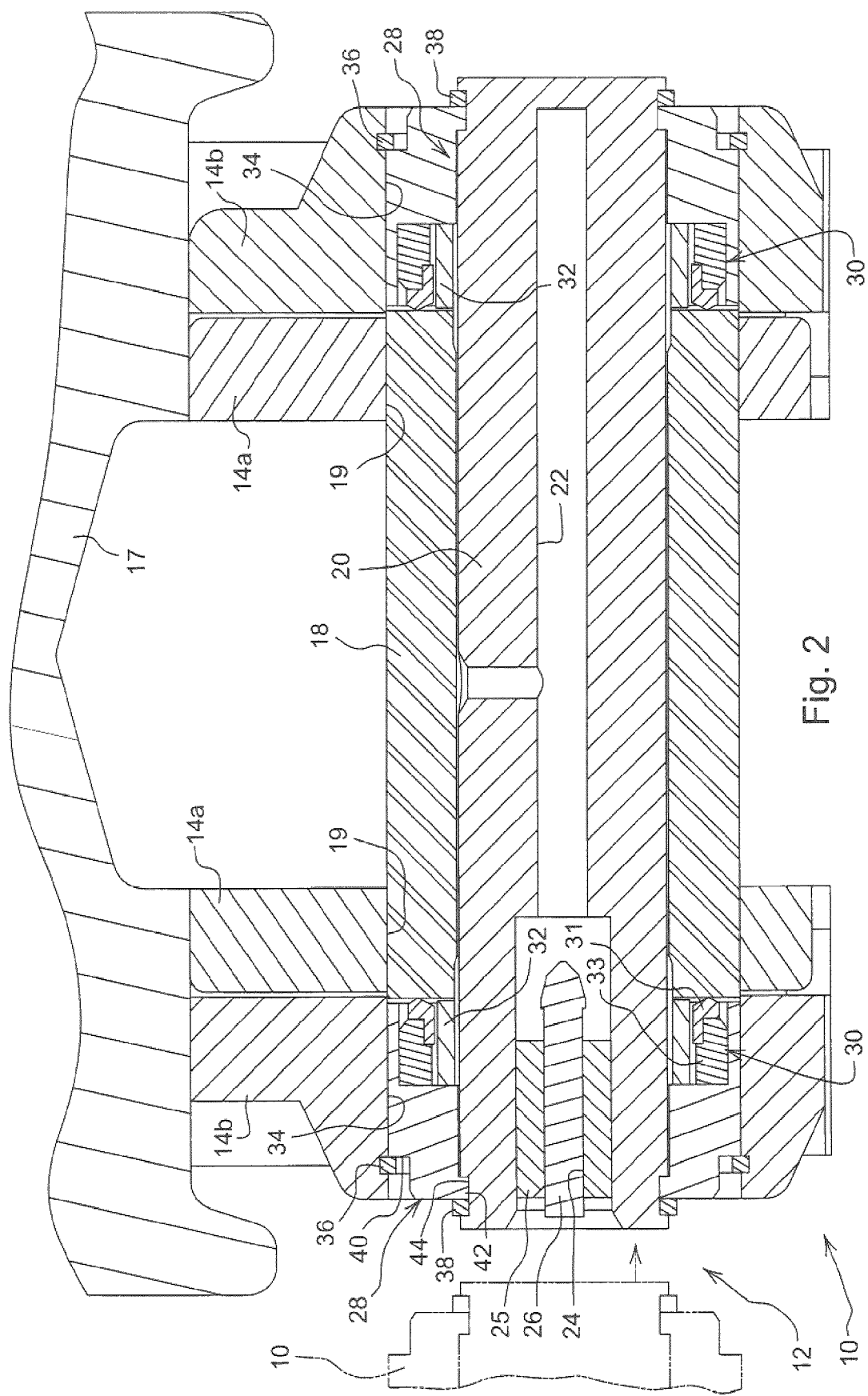
FIG. 2 is a sectional view taken along lines 2-2 of FIG. 1 showing a cartridge acting as a joint between a number of links of a track chain.

Referring to FIG. 2, there is shown a sectional view of the endless track chain 10. Attached to each cartridge 12 are a pair of first links 14a of the links 14 and a pair of second links 14b of the links 14. The cartridge 12 acts as a joint joining the first links 14a and the second links 14b for relative rotation between the first links 14a and the second links 14b.

The cartridge 12 has a bushing 18 to which the first links 14a are fixed at opposite ends of the bushing 18. Exemplarily, the bushing 18 is press-fit into a bore 19 of each link 14.

A pin 20 is received in the bushing 18. Lubricant (e.g., oil) from a lubricant cavity 22 formed in the pin 20 lubricates the interface between the bushing 18 and the pin 20 for relative rotation between the bushing 18 and the pin 20. The lubricant can be injected into the cavity 22 via a channel 24 formed in a compressible body 25 upon removal of a plug 26 that normally closes the channel 24.

The cartridge 12 further includes a pair of collars 28. The collars 28 are located at opposite ends of the pin 20 on either side of the bushing 18. Each collar 28 cooperates with the bushing 18 to capture therebetween a seal 30 designed to inhibit leakage of the lubricant and inhibit contamination of the lubricant by ingress of debris. Illustratively, the seal 30 has a seal element 31 (made, for example, of polyurethane) for contacting the bushing 18 and a seal-loading member 33 (made, for example, of nitrile) for loading the seal element 31 against the bushing 18. It is to be understood that the seal 30 may be configured in a wide variety of ways, the particular embodiment illustrated being just one of those possible ways. A spacer ring 32 is located between each collar 28 and the bushing 18 to space the collar 28 slightly apart from the bushing 18 for relative rotation between the bushing 18 and the collar 28.

Each collar 128 is disposed between, and fixed to, a second link 14b and an end of the pin 20 for rotation with the link 14b and pin 20 relative to the bushing 18 and the first links 14. The collar 28 is received in a bore 34 of the link 14b such that a radially outer surface of the collar 28 mates with, and is press-fit into, the bore 34 and a radially inner surface of the collar 28 mates with a radailly outer surface of the pin 20 which is press-fit into the collar 28.

Retaining rings 36, 38 at each end of the cartridge 12 act to retain the cartridge 12 in place. The retaining ring 36 acts at an interface between the collar 28 and the bore 34. The ring 36 is received by a groove 40 formed in the radially outer surface of the collar 28. The retaining ring 38 acts at an interface between the collar 28 and the pin 20. A lip 42 of the collar 28 extends into a groove 44 formed in the pin 20 to act against the ring 38 and a shoulder of the groove 44 to promote retention of the components of the cartridge 12.

The cartridge 12 is formed before introduction of the cartridge 12 to the links 14, 14b. During formation of the cartridge 12, the pin 20 is inserted into the bushing 18 and the spacer rings 32 are inserted into the ends of the bushing 18. The ends of the pin 20 are inserted into the collars 28 such that the lips 42 are received in the grooves 44, capturing the seals 30 between the collars 28 and the ends of the bushing 18. Retaining rings 38 are installed to help hold the collars 28 in place.

After formation of the cartridge 12, the cartridge 12 is introduced to the links 14, 14b. The cartridge 12 is inserted into the bores 19 of the links 14a and the bores 34 of the links 14b so as to establish a press-fit between the bushing 18 and the links 14a and a press-fit between the collars 28 and the links 14b. The retaining rings 36 are then installed. Lubricant may be injected into the cartridge 12 before or after introduction of the cartridge 12 to the links 14, 14b.

Figure 3:
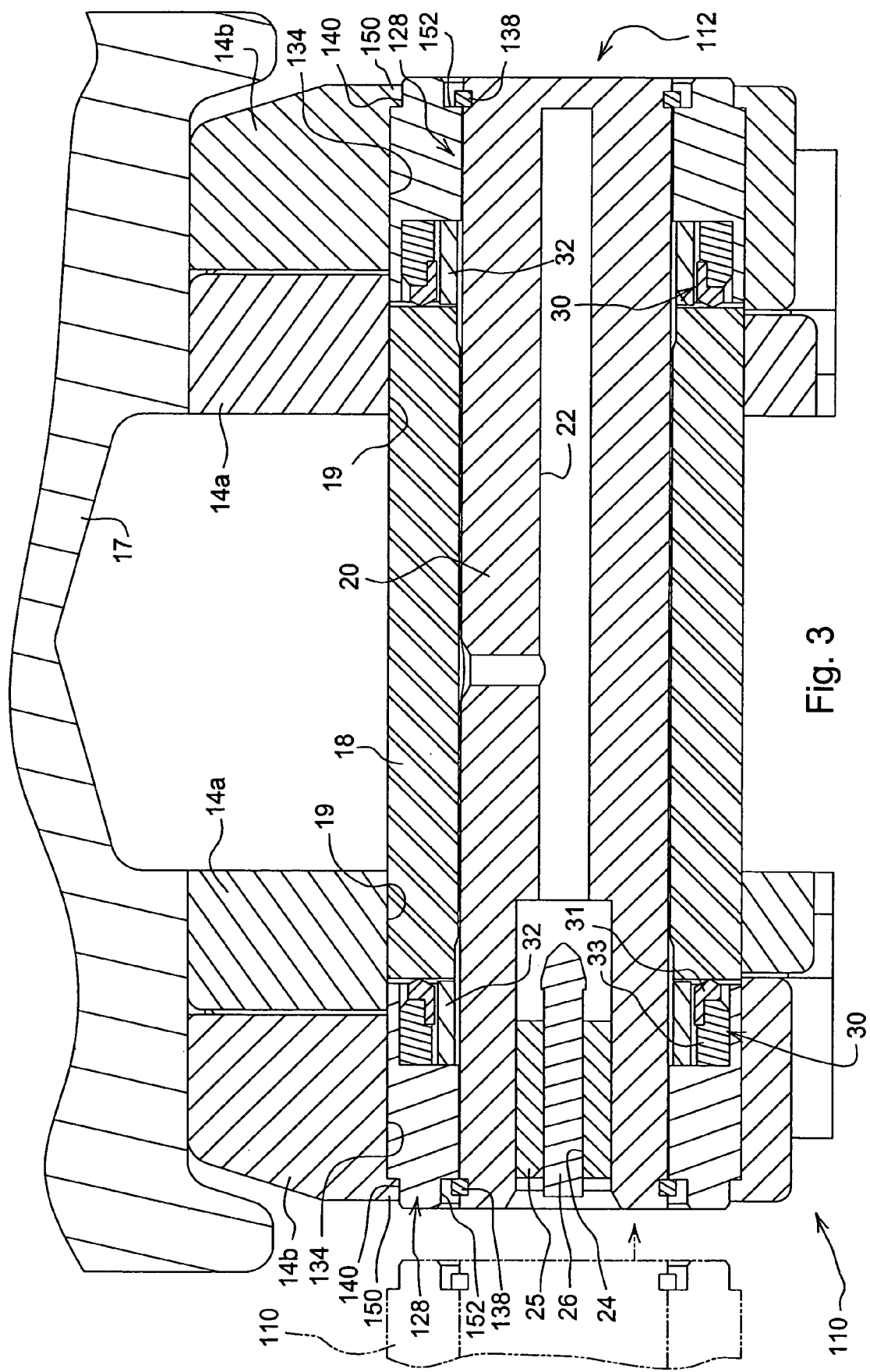
FIG. 3 is a sectional view showing an alternative cartridge which may be used in place of the cartridge of FIG. 2.

Referring to FIG. 3, an endless track chain 110 may be used on the vehicle 9 in place of the track chain 10. Some of the components of the track chain 110 are similar to those of the track chain 10 such that identical reference numbers refer to similar components, the main differences being discussed below.

The track chain 110 has a cartridge 112 which acts as a joint joining the pair of first links 14a and the pair of second links 14b. The cartridge 112 is formed prior to introduction to the links 14, 14b. After the cartridge 112 is formed, it is introduced to the links 14, 14b and attached thereto. Such pre-assembly of the cartridge 112 promotes the integrity of the seals 30 in the cartridge 112 and thus the longevity of the cartridge 112.

The cartridge 112 has a bushing 18 that is fixed to the links 14a and receives the pin 20 for relative rotation between the bushing 18 and the pin 20. Lubricant injected into the cavity 22 via the channel 24 lubricates the interface between the bushing 18 and the pin 20.

The cartridge 112 includes a pair of collars 128. The collars 128 are located at opposite ends of the pin 20 on either side of the bushing. Each collar 128 cooperates with the bushing 18 to capture therebetween a seal 30 and is spaced slightly apart from the bushing 18 by a spacer ring 32 for relative rotation between the collar 128 and the bushing 18.

Each collar 128 is disposed between, and fixed to, a second link 14b and an end of the pin 20 for rotation with the link 14b and pin 20 relative to the bushing 18 and the first links 14. The collar 128 is received in the bore 134 of the link 14b such that a radially outer surface of the collar 128 mates with, and is press-fit into, the bore 134 and a radially inner surface of the collar 128 mates with a radailly outer surface of the pin 20 which is press-fit into the collar 128. The link 14b has a lip 150 extending radially inwardly into a groove 140 formed in the radially outer surface of the collar 128 to promote retention of the cartridge 112 in place. A retaining ring 138 acts at the interface of the pin 20 and a shoulder of a groove 152 formed in the radially inner surface of the collar 128 for retention of the components of the cartridge 112.

The cartridge 112 is formed before introduction of the cartridge 112 to the links 14, 14b. During formation of the cartridge 112, the pin 20 is inserted into the bushing 18 and the spacer rings 32 are inserted into the end of the bushing 18. The ends of the pin 20 are inserted into the collars 128 so as to capture the seals 30 between the collars 128 and the ends of the bushing 18. The retaining rings 138 are then installed.

After formation of the cartridge 112, the cartridge 112 is introduced to the links 14, 14b. The cartridge 112 is inserted into the bores 19 of the links 14a and the bores 134 of the links 14b so as to establish a press-fit between the bushing 18 and the links 14a and a press-fit between the collars 128 and the links 14b. In particular, one of the second links 14b may be removed or otherwise moved out of the way to avoid interference with the lip 150 thereof so as to facilitate insertion of the cartridge 112 into the two first links 14a and the other second link, after which the remaining second link 14b may be pressed onto the respective collar 128. Lubricant may be injected into the cartridge 112 before or after introduction of the cartridge 12 to the links 14, 14b.

While the disclosure has been illustrated and described in detail in the drawings and foregoing description, such an illustration and description is to be considered as exemplary and not restrictive in character, it being understood that illustrative embodiments have been shown and described and that all changes and modifications that come within the spirit of the disclosure are desired to be protected. It will be noted that alternative embodiments of the present disclosure may not include all of the features described yet still benefit from at least some of the advantages of such features. Those of ordinary skill in the art may readily devise their own implementations that incorporate one or more of the features of the present disclosure and fall within the spirit and scope of the present invention as defined by the appended claims.

The invention claimed is:

1. An endless track chain, comprising:
a first link, a second link, a third link, and a fourth link, and
a cartridge joining the first and second links for relative rotation therebetween and the third and fourth links for relative rotation therebetween, the cartridge comprising a pin, a bushing disposed between the pin and the first and third links such that the bushing is fixed to the first link and the third link and receives the pin for relative rotation between the bushing and the pin, a first seal, a second seal, a first collar cooperating with the bushing to capture the first seal therebetween and disposed between the second link and the pin so as to be fixed to the second link and the pin, and a second collar cooperating with the bushing to capture the second seal therebetween and disposed between the fourth link and the pin so as to be fixed to the fourth link and the pin, the first collar and the second collar being distinct respectively from the second link and the fourth link, wherein an end of each of the first and second collars is axially even with a respective end of the pin.

2. The endless track chain of claim 1, wherein the cartridge comprises a first spacer ring and a second spacer ring, the first spacer ring is disposed between the first collar and the bushing so as to space the first collar and the bushing apart from one another, and the second spacer ring is disposed between the second collar and the bushing so as to space the second collar and the bushing apart from one another.

3. The endless track chain of claim 1, wherein each of the first collar and the second collar comprises a groove, and the second link comprises a lip extending into the groove of the first collar, and the fourth link comprises a lip extending into the groove of the second collar.

4. The endless track chain of claim 1, comprising a retaining ring acting at an interface between the collar and the second link.

5. The endless track chain of claim 1, wherein the pin comprises a groove, and the collar comprises a lip extending into the groove.

6. The endless track chain of claim 1, comprising a retaining ring acting at an interface between the first collar and the pin and a retaining ring acting at an interface between the second collar and the pin.

7. The endless track chain of claim 1, wherein the first and second collars are disposed along the pin at opposite ends thereof.

8. The endless track chain of claim 7, wherein the first collar is press-fitted into the second link, and the second collar is press-fitted into the fourth link.

9. A cartridge for use as a joint to join first and second links of an endless track chain for relative rotation between the first and second links and third and fourth links of the endless track chain for relative rotation between the third and fourth links, the cartridge comprising:
a pin,
a bushing receiving the pin for relative rotation therebetween, the bushing being adapted to be received by the first link so as to be fixed thereto and the third link so as to be fixed thereto, a first seal and a second seal, and a first collar and a second collar, the first collar cooperating with the bushing to capture the first seal therebetween and receiving the pin so as to be fixed thereto, the second collar cooperating with the bushing to capture the second seal therebetween and receiving the pin so as to be fixed thereto, the first collar and the second collar being distinct respectively from and adapted to be fixed respectively to the second link and the fourth link, wherein an end of each of the first and second collars is axially even with a respective end of the pin.

10. The cartridge of claim 9, wherein each of the first collar and the second collar comprises a groove formed in a radially outer surface of the collar.

11. The cartridge of claim 9, comprising a retaining pin acting between the first collar and the pin and a retaining pin acting between the second collar and the pin.

12. The cartridge of claim 9, wherein the first and second collars are disposed along the pin at opposite ends thereof on either side of the bushing in spaced-apart relation to the bushing.

* * * * *